(12) United States Patent
Kochi et al.

(10) Patent No.: US 8,559,164 B2
(45) Date of Patent: Oct. 15, 2013

(54) SOLID ELECTROLYTIC CAPACITOR

(75) Inventors: Ayumi Kochi, Osaka (JP); Yukihiro Shimasaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/809,446

(22) PCT Filed: Jul. 27, 2011

(86) PCT No.: PCT/JP2011/004231
§ 371 (c)(1),
(2), (4) Date: Jan. 10, 2013

(87) PCT Pub. No.: WO2012/017618
PCT Pub. Date: Feb. 9, 2012

(65) Prior Publication Data
US 2013/0114184 A1  May 9, 2013

(30) Foreign Application Priority Data
Aug. 2, 2010  (JP) ................................ 2010-173366

(51) Int. Cl.
*H01G 9/00* (2006.01)
*H01G 4/06* (2006.01)

(52) U.S. Cl.
USPC ............................ 361/523; 361/532; 361/524

(58) Field of Classification Search
USPC ........................ 361/523, 524, 532; 29/25.03
See application file for complete search history.

(56) References Cited

U.S. PATENT DOCUMENTS

| 5,005,107 A | 4/1991 | Kobashi et al. |
| 2003/0081373 A1 | 5/2003 | Hamada et al. |
| 2005/0254198 A1 | 11/2005 | Matsumoto et al. |
| 2006/0215352 A1 | 9/2006 | Take et al. |
| 2007/0230092 A1* | 10/2007 | Bruner et al. ................. 361/523 |
| 2008/0232039 A1* | 9/2008 | Saito et al. ..................... 361/534 |
| 2008/0250621 A1* | 10/2008 | Naito et al. .................... 29/25.03 |
| 2008/0310081 A1* | 12/2008 | Shimizu et al. ............... 361/529 |
| 2009/0116173 A1* | 5/2009 | Shimizu et al. ............... 361/529 |
| 2009/0135550 A1* | 5/2009 | Umemoto et al. ............ 361/523 |
| 2010/0027194 A1* | 2/2010 | Ota et al. ....................... 361/523 |
| 2010/0149729 A1* | 6/2010 | Nishioka ........................ 361/525 |

FOREIGN PATENT DOCUMENTS

| JP | 2-265233 | 10/1990 |
| JP | 6-151261 | 5/1994 |
| JP | 9-296158 | 11/1997 |
| JP | 2003-082194 | 3/2003 |
| JP | 2003-203828 | 7/2003 |
| JP | 2004-363575 | 12/2004 |
| JP | 2005-093741 | 4/2005 |
| JP | 2006-253169 | 9/2006 |
| JP | 2006-269570 | 10/2006 |
| WO | 2007/077914 | 7/2007 |

* cited by examiner

OTHER PUBLICATIONS

International Search Report of PCT Application No. PCT/JP2011/004231 dated Oct. 11, 2011..

*Primary Examiner* — Jayprakash N Gandhi
*Assistant Examiner* — Dion Ferguson
(74) *Attorney, Agent, or Firm* — Panasonic Patent Center

(57) ABSTRACT

A silver paste layer constituting a collector layer in a solid electrolytic capacitor includes first silver particles having a peak particle size of 150 nm or less, second silver particles having a peak particle size of 500 nm or more, inorganic particles composed of material different from silver, and resin material. The inorganic particles are included at a volume ratio of 15% or more and 50% or less with respect to the total of the first silver particles and the second silver particles.

4 Claims, 4 Drawing Sheets

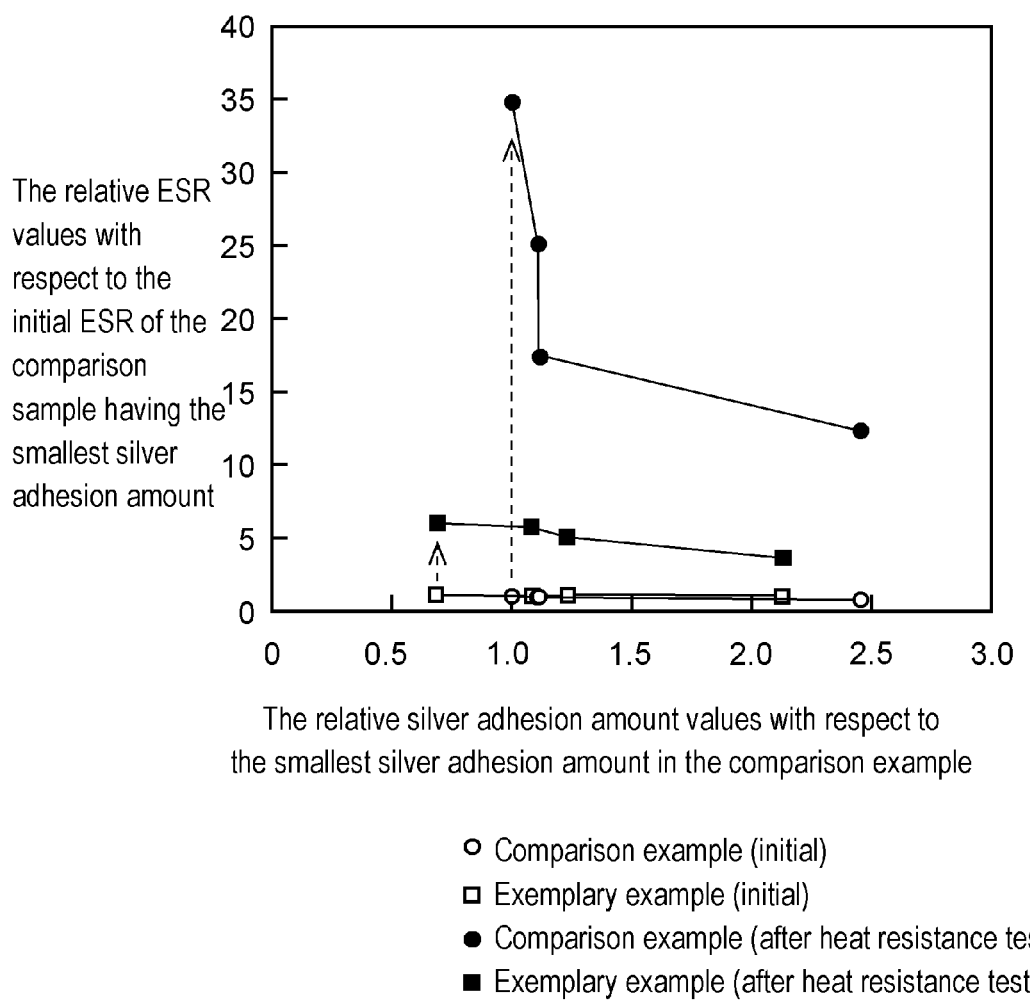

SOLID ELECTROLYTIC CAPACITOR

TECHNICAL FIELD

The present invention relates to a solid electrolytic capacitor. In particular, the present invention relates to a silver paste layer constituting a collector layer formed on the solid electrolyte layer.

BACKGROUND ART

A solid electrolytic capacitor has a small size, a large capacity and a low equivalent series resistance (ESR). Thus, the solid electrolytic capacitor is used at the periphery of the CPU in a personal computer. The solid electrolytic capacitor as described above has a capacitor element and a pair of external terminals. The capacitor element has a base body composed of conductive material, a dielectric film formed on this base body, a solid electrolyte layer formed on this dielectric film, and a collector layer formed on this solid electrolyte layer. The pair of external terminals is electrically connected to the base body and the collector layer, respectively.

The collector layer has a carbon layer formed on the solid electrolyte layer, and a silver paste layer formed on this carbon layer. The silver paste layer is formed by kneading silver particles having a peak size of about 1 μm, epoxy resin, and curing agent for example. In recent years, approaches are suggested to reduce the contact resistance between the silver paste layer and the carbon layer to thereby reduce the ESR of the electrolytic capacitor. As one of the approaches, mixing the silver paste layer with small silver particles having a peak particle diameter of 1 to 100 nm to improve the contact with the carbon layer is proposed (e.g., Patent Literature 1).

The silver paste layer including small silver particles provides a reduced contact resistance with the carbon layer. Thus, the silver paste layer can have a reduced thickness with the same amount of silver. However, the silver paste layer having a reduced thickness causes a shorter oxygen permeation path. Thus, the solid electrolyte layer is increasingly oxidized and deteriorated with time passage, or thermally-oxidized, thus resulting in an increased ESR.

CITATION LIST

Patent Literature

PTL 1: Japanese Patent Unexamined Publication No. 2005-93741

SUMMARY OF THE INVENTION

The present invention provides a solid electrolytic capacitor having a further-reduced ESR. The solid electrolytic capacitor of the present invention has a capacitor element, a first external terminal and a second external terminal. The capacitor element has a base body composed of conductive material, a dielectric film formed on the base body, a solid electrolyte layer formed on the dielectric film, and a collector layer formed on the solid electrolyte layer including at least a silver paste layer. The first external terminal is electrically connected to the base body and the second external terminal is electrically connected to the collector layer, respectively. The silver paste layer includes first silver particles having a peak particle size (diameter) of 150 nm or less, second silver particles having a peak particle size of 500 nm or greater, inorganic particles composed of material different from silver, and resin material. The inorganic particles are included at a volume ratio of 15% or more and 50% or less with respect to the total of the first silver particles and the second silver particles. By mixing the silver paste layer with the inorganic particles at such a ratio, the silver paste layer can have an increased thickness at a low cost and an oxygen permeation path can have a longer length. As a result, the solid electrolytic capacitor can have a further-reduced ESR. In other words, according to the present invention, the solid electrolyte layer can be suppressed from being oxidized and the solid electrolytic capacitor can have a further-reduced ESR while using the first silver particles having a small size to reduce the contact resistance between the silver paste layer and the carbon layer. The silver paste layer also may be formed to include first silver particles having a peak particle size of 150 nm or less obtained by surrounding the inorganic particles as a core with silver, the second silver particles, and the resin material both mentioned above.

BRIEF DESCRIPTION OF THE DRAWINGS

FIG. 3 shows a graph illustrating the relationship between the silver adhesion amount and the ESR characteristic in the solid electrolytic capacitor according to the embodiment of the present invention.

DESCRIPTION OF EMBODIMENTS

Figure 1:
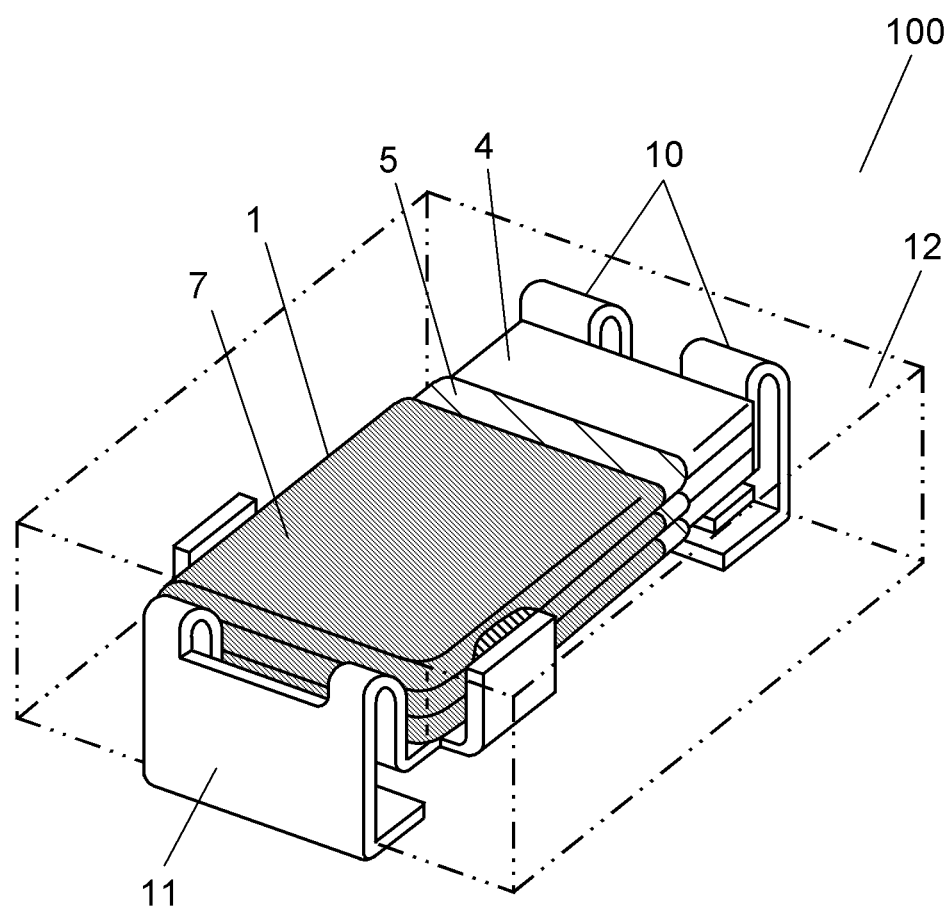
FIG. 1 is a perspective view illustrating a solid electrolytic capacitor according to an embodiment of the present invention.
Figure 2A:
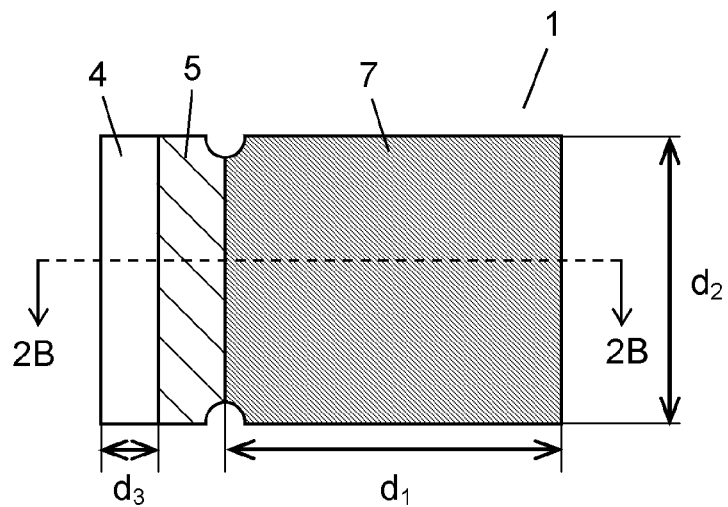
FIG. 2A is a top view illustrating a capacitor element used for the solid electrolytic capacitor shown in FIG. 1.
Figure 2B:
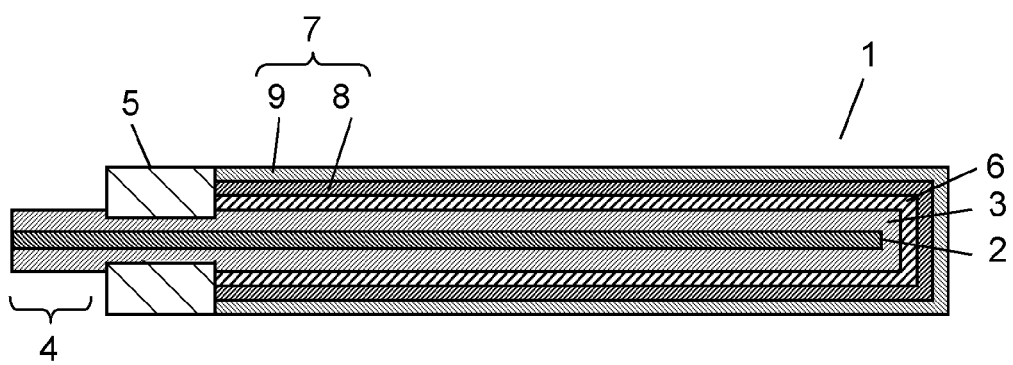
FIG. 2B is a cross-sectional view illustrating the capacitor element shown in FIG. 2A.

FIG. 1 is a perspective view illustrating solid electrolytic capacitor 100 including laminated capacitor elements 1, according to an embodiment of the present invention. FIG. 2A and FIG. 2B are a top view and a cross-sectional view illustrating capacitor element 1 having a flat plate shape, respectively. In this embodiment, solid electrolytic capacitor 100 using conductive polymer material as electrolyte will be exemplarily described.

Solid electrolytic capacitor 100 has capacitor elements 1, anode terminal 10 as a first external terminal, and cathode terminal 11 as a second external terminal. As shown in FIGS. 2A and 2B, capacitor element 1 has base body 2 composed of conductive material, dielectric film 3, solid electrolyte layer 6, and collector layer 7. Dielectric film 3 is formed on base body 2. Solid electrolyte layer 6 is formed on dielectric film 3. Collector layer 7 is formed on solid electrolyte layer 6. Collector layer 7 includes at least silver paste layer 9. Anode terminal 10 is electrically connected to base body 2. Cathode terminal 11 is electrically connected to collector layer 7.

Base body 2 and dielectric film 3 form an anode foil. On the anode foil, insulating section 5 is formed so as to press dielectric film 3. Insulating section 5 is provided for the separation between anode section 4 and a cathode formation section (not shown) and is composed of insulating resin or an insulating tape, for example. On dielectric film 3 of the cathode formation section, solid electrolyte layer 6 composed of conductive polymer and collector layer 7 are formed. Collector layer 7 is composed of carbon layer 8 as a lower layer, and silver paste layer 9 formed on carbon layer 8. Solid electrolyte layer 6 and collector layer 7 constitute the cathode of capacitor element 1.

In the example shown in FIG. 1, capacitor elements 1 are laminated. Anode sections 4 are respectively connected to anode terminal 10 by a welding technique such as a laser welding and a resistance welding. Collector layer 7 is connected to cathode terminal 11 by conductive adhesive material.

Anode terminal 10 and cathode terminal 11 as well as capacitor elements 1 are covered by exterior package 12 composed of insulating resin in an integrated manner so that anode terminal 10 and cathode terminal 11 are partially exposed at the outer surface, respectively. When a part of anode terminal 10 and cathode terminal 11 exposed from exterior package 12 is bent to the bottom face along exterior package 12, anode terminal 10 and cathode terminal 11 are formed at the bottom face. In this manner, surface-mounted solid electrolytic capacitor 100 is formed.

Base body 2 is an aluminum foil whose surface is roughened by etching, for example, so that the surface includes many holes. Base body 2 may have a flat surface, however, it is preferable that base body 2 has a roughened surface to have an increased capacity. Instead of etching, the surface of base body 2 also can be roughened by vapor deposition, aerosol or the like so as to laminate fine particles of valve metal on base body 2.

Dielectric film 3 is formed by anodically-oxidizing base body 2, for example. In a case that base body 2 is an aluminum foil, dielectric film 3 is composed of aluminum oxide. Instead of the anode oxidation, dielectric film 3 also may be formed by vapor deposition, plating, or the like. In this case, in addition to aluminum oxide, dielectric film 3 may be constituted by oxide or nitride (e.g., titanium nitride or titanium oxide). Although the anode foil made of aluminum is described, valve metal material such as titanium, tantalum or the alloy material thereof also may be used.

Silver paste layer 9 includes first silver particles, second silver particles, inorganic particles composed of material different from silver, and resin material. The first silver particles have a peak particle size (diameter) of 150 nm or less. The second silver particles have a peak particle size of 500 nm or greater. The resin material is composed of epoxy resin and curing agent, for example. The silver paste layer 9 is mainly composed of the silver components constituting the first silver particles and the second silver particles. The inorganic particles may be, for example, silica, glass, alumina, or graphite.

The silver paste material as described above is diluted by diluent such as terpineol so as to be coatable. Then, the resultant silver paste is coated on solid electrolyte layer 6 and is cured at about 200° C. for 10 minutes, thereby forming silver paste layer 9. Carbon layer 8 provided under silver paste layer 9 may be omitted.

The following section will describe the effect of silver paste layer 9 in solid electrolytic capacitor 100. Silver paste layer 9 includes the inorganic particles. By mixing the low-cost inorganic particles in silver paste layer 9 as described above, the thickness of silver paste layer 9 can be maintained at a low cost and the length of the oxygen permeation path can be elongated. As a result, solid electrolytic capacitor 100 can have a further-reduced ESR.

From the viewpoint as described above, it is necessary that the inorganic particles be included at a volume ratio of 15% or more and 50% or less with respect to the total of the first and second silver particles. If the inorganic particles are included in a smaller amount, the above-described effect is suppressed from being achieved. If the volume ratio exceeds 50%, the conducting network of the silver components is influenced and silver paste layer 9 itself has an increased resistivity. As a result, the ESR is increased.

The inorganic particles may be formed by any material that can endure a reflow temperature, including insulating and conductive materials. The inorganic particles also may be organic material if the above conditions are satisfied. However, inorganic particles are more easily obtained in reality. Since organic material has a linear expansion coefficient higher than that of inorganic material, there is a risk in which organic material causes the silver particles to peel from one another in silver paste layer 9 when heated.

When surface-mounted solid electrolytic capacitor 100 is mounted on a circuit board (not shown), solid electrolytic capacitor 100 is subjected to a high temperature of about 260° C. in the reflow step. During the reflow step, the inorganic particles, which have a higher melting point than that of resin of organic material, can retain the shapes in silver paste layer 9. Thus, silver paste layer 9 can be suppressed from being deformed even during the reflow step, oxygen permeation can be suppressed, and the oxidation of solid electrolyte layer 6 due to the heat can be suppressed. As a result, reliability in view of the ESR can have improved.

It is preferable that carbon layer 8 and silver paste layer 9 have a reduced energy barrier therebetween to thereby reduce the resistance at the interface therebetween. Thus, the inorganic particles are preferably conducting material. Graphite constituting carbon layer 8 is preferable in particular.

As described above, the first silver particles have a peak particle size (diameter) of 150 nm or less and the second silver particles have a peak particle size of 500 nm or greater. By using the two types of silver particles having different peak particle sizes as described above, solid electrolytic capacitor 100 can have a reduced ESR and a reduced cost. Specifically, the first silver particles having a smaller size can reduce the contact resistance with carbon layer 8 and the second silver particle having a larger size can reduce the cost and the specific resistance of silver paste layer 9.

The first silver particles preferably have a peak particle size of 10 nm or more. Silver particle may be manufactured by a physical method of pulverizing bulk metal or a chemical manufacturing method of forming metal atoms out of ions or complexes as a precursor to aggregate the metal atoms. The chemical manufacturing method is more suitable to prepare fine silver particles. However, to prepare the first silver particles having a peak particle size smaller than 10 nm, such a size is practically difficult to be formed even by the chemical manufacturing method and requires a high production cost. Thus, the first silver particles preferably have a peak particle size of 10 nm or more.

The second silver particles preferably have a peak particle size of 5 μm or less. The peak particle exceeding 5μm causes a larger gap between the particles. This means that the first silver particles in a higher amount are required in order to fill such gaps to connect the second fine particles, thus resulting in a higher cost.

The inorganic particles have a peak particle size of about 50 nm or greater and about 500 nm or less, for example. The inorganic particles preferably have a smaller peak particle size than that of the second silver particles because the specific resistance of silver paste layer 9 can be maintained at a low level.

The weight ratio between the total of the silver components of the first silver particles and the second silver particles and epoxy resin is 90:10, for example. In other words, the silver components are included at a weight ratio of 90 wt % of the total of the silver components and the resin components. As described above, the silver components are preferably included at a weight ratio of 70 wt % or more and 95 wt % or less with respect to the total of the silver components and the resin components because the specific resistance of silver paste layer 9 can be maintained at a low level.

When assuming that the total of the first silver particles and the second silver particles is 100 wt %, it is preferable that the first silver particles are included at a ratio of 10 wt % or more and 60 wt % or less. The reason is that the contact resistance with carbon layer 8 can be maintained at a low level and the specific resistance of silver paste layer 9 can be maintained at a low level.

The following section will describe the result of the experiment on the volume ratio of the inorganic particles to the total of the first silver particles and the second silver particles. In this experiment, the first silver particles having a peak particle size of 100 nm and the second silver particles having a peak particle size of 3000 nm are used. The first silver particles are included at a ratio of 50 wt % with respect to the total of the silver components. In other words, the second silver particles are included at a ratio of 50 wt % in the total of the silver components. Graphite having a peak particle size of 500 nm is also included as the inorganic particles. The silver components are included at a weight ratio of 90 wt % with respect to the total of the silver components and the resin components of epoxy resin.

FIG. 3 shows the result of an exemplary example regarding the relationship between the thickness of silver paste layer 9 and the heat resistance (a change in ESR characteristic) under the above-described conditions where the inorganic particles are included at a volume ratio of 25% with respect to the total of the first silver particles and the second silver particles. FIG. 3 shows a graph illustrating the relationship between the silver adhesion amount and the ESR characteristic in a piece of capacitor element 1 using silver paste layer 9. There is a correlation between the silver adhesion amount and the thickness of the silver paste layer. Thus, an increase of the silver adhesion amount means an increase of the thickness of silver paste layer 9. The ESR of 100 kHz is measured by a precision impedance analyzer (4294A made by Agilent). As shown in FIG. 2A, capacitor element 1 of which ESR is measured has a rectangular shape. Silver paste layer 9 has width $d_1$ of 4 mm in the long axis direction of capacitor element 1 and has width $d_2$ of 3 mm in the short axis direction. Anode section 4 has width $d_3$ of 2 mm in the long axis direction of the capacitor element.

FIG. 3 also shows the result of a comparison example in addition to the above exemplary example. In the comparison example, another silver paste layer is used. The silver paste layer includes no inorganic particles but includes the first silver particles, the second silver particles, and the epoxy resin at the same ratio as in the exemplary example. The initial ESR and the ESR after a heat resistance test are measured both for the exemplary example and the comparison example. In the heat resistance test, the samples are left in air at 125° C. for 250 hours.

In FIG. 3, the vertical axis shows the relative values of the ESR characteristics of the samples based on the initial ESR of a sample having the smallest silver adhesion amount (a sample having the thinnest silver paste layer) in the comparison example. The horizontal axis shows the relative values of the silver adhesion amounts of the respective samples based on the silver adhesion amount of a sample having the smallest silver adhesion amount (a sample having the thinnest silver paste layer) in the comparison example.

As can be seen from FIG. 3, in the case of the comparison example, the ESR before the heat resistance test shows no change even when the silver adhesion amount (i.e., the thickness of the silver paste layer) changes and the ESR is maintained at a low value. The ESR after the heat resistance test on the other hand shows a larger change as the silver adhesion amount is smaller. In contrast with this, in the case of the exemplary example, the ESR characteristic shows substantially no change depending on a change in the silver adhesion amount both before and after the heat resistance test.

As can be seen from the above, in the case of the exemplary example in which the inorganic particles of graphite are added, the time degradation of the ESR characteristic can be suppressed even when the silver adhesion amount is reduced. The reason is that the inorganic particles mixed in silver paste layer 9 can increase the thickness of silver paste layer 9 without using high-cost silver material. This can consequently provide a longer oxygen permeation path and can suppress the oxidation degradation of solid electrolyte layer 6. As a result, the ESR can be suppressed from increasing as time passes. Furthermore, the use of the first silver particles can reduce the contact resistance between silver paste layer 9 and carbon layer 8 even when inorganic particles having a lower electric conductivity than that of silver are included.

Next, the following section will describe an appropriate volume ratio of inorganic particles of graphite with respect to the total of the first silver particles and the second silver particles. Table 1 shows different volume ratios of the inorganic particles with respect to the total of the first silver particles and the second silver particles. Based on these different volume ratios shown in Table 1, pastes are prepared using terpineol and coated and dried on glass plates to prepare test pieces. The test pieces are measured with regard to the specific resistance and the contact resistance based on the measurement method as described below.

With regard to the specific resistance, the surface resistance is measured and calculated by pushing the probe of a resistivity meter (LORESTA GP MCP-T600 made by Mitsubishi Chemical Corporation) onto the surface of the silver paste.

The contact resistance is measured by firstly pushing resistance measurement terminals to the formed silver paste layer with a predetermined gap therebetween, and the resistance (total resistance) is measure. By plotting the total resistances for the respective gaps to calculate a proportional relationship thereamong, the point having a zero gap can be estimated as a contact resistance. The total resistance is measured by a digital multi-meter (34401A made by Agilent). The gap distance is measured by a digital microscope (KH-3000 made by HIROX).

After subjecting these test pieces to air at 125° C. for 50 to 280 hours, the contact resistance and the specific resistance are similarly measured. The results thereof are also shown in Table 1.

TABLE 1

| Graphite addition amount: Volume ratio (%) when assuming that silver is 100% | Film thickness (μm) | Specific resistance (μΩ·cm) | | | | Contact resistance (Ω) | | | |
|---|---|---|---|---|---|---|---|---|---|
| | | Initial | Heat resistance at 125° C. | | | Initial | Heat resistance at 125° C. | | |
| | | 0 H | 50 H | 120 H | 280 H | 0 H | 50 H | 120 H | 280 H |
| 0 | 21 | 6.5 | 6.6 | 6.6 | 6.5 | 0.19 | 0.19 | 0.19 | 0.19 |
| 15 | 28 | 10.6 | 10.5 | 10.5 | 10.5 | 0.19 | 0.19 | 0.19 | 0.19 |
| 25 | 30 | 11.2 | 11.3 | 11.3 | 11.2 | 0.20 | 0.20 | 0.20 | 0.20 |
| 40 | 29 | 22.2 | 22.1 | 22.2 | 22.2 | 0.21 | 0.21 | 0.21 | 0.21 |
| 50 | 30 | 35.1 | 35 | 35.3 | 35.2 | 0.23 | 0.23 | 0.24 | 0.24 |

As can be seen from the results shown in Table 1, when the inorganic particles are included at a volume ratio of 15% to 40% with respect to the total of the first silver particles and the second silver particles, the specific resistance is lower than 25 μΩ·cm and the bulk resistance of the silver paste layer 9 is maintained at a low level. When the inorganic particles are included at a volume ratio of 50% with respect to the total of the first silver particles and the second silver particles, the specific resistance slightly increases to 35.1 μΩ·cm. On the other hand, the contact resistance is maintained at a low level of about 0.2 when the inorganic particles are included at a volume ratio of 15% to 50% with respect to the total of the first silver particles and the second silver particles. These tendencies are also observed after the storage at a high temperature.

The ESR characteristic of capacitor element 1 is more influenced by the resistance of the interface with solid electrolyte layer 6 or carbon layer 8 than by the bulk resistance of silver paste layer 9. Thus, it is preferable that the inorganic particles are included at a volume ratio of 15% or more and 50% or less with respect to the total of the first silver particles and the second silver particles and silver paste layer 9 has an increased thickness. By the configuration as described above, capacitor element 1 can presumably be suppressed, as in the exemplary example shown in FIG. 3, from having a deteriorated ESR characteristic. When the inorganic particles are included at a volume ratio of 15% or more and 40% or less with respect to the total of the first silver particles and the second silver particles, it is considered that the specific resistance also can be reduced and thus a lower ESR can be obtained.

Figure 4:
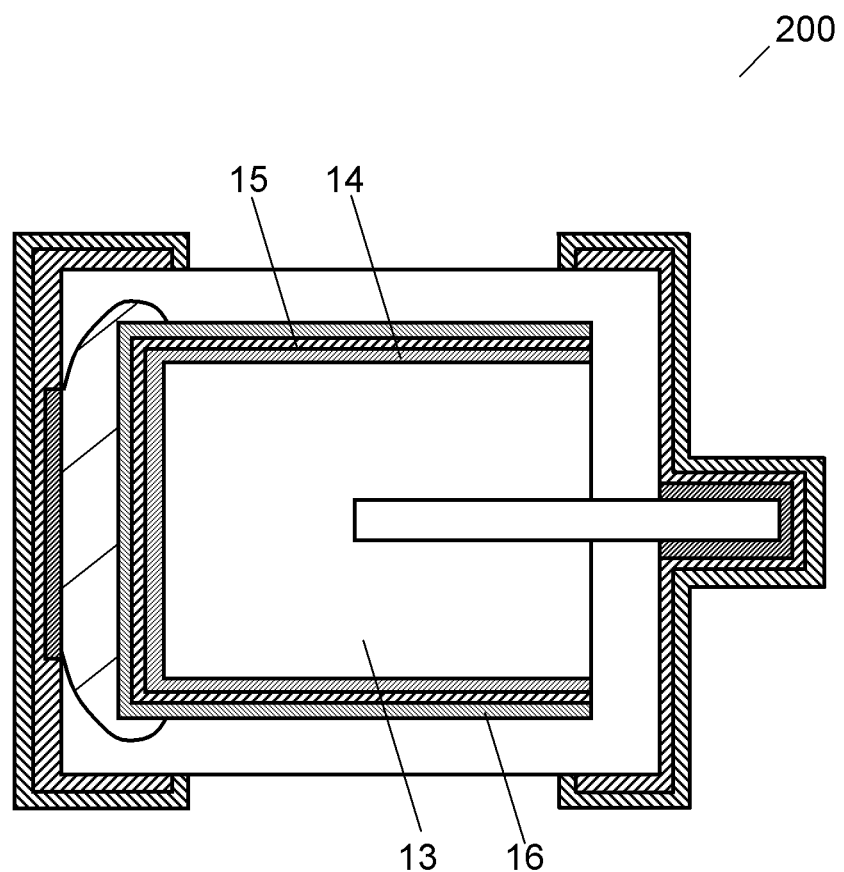
FIG. 4 is a cross-sectional view illustrating another solid electrolytic capacitor according to the embodiment of the present invention.

Solid electrolytic capacitor 100 shown in FIG. 1 to FIG. 2B is configured so that base body 2 is composed of aluminum and solid electrolyte layer 6 is composed of conductive polymer. Alternatively, silver paste layer 9 can be applied to solid electrolytic capacitor 200 of tantalum as shown in FIG. 4. FIG. 4 is a cross-sectional view illustrating another solid electrolytic capacitor 200 according to the embodiment of the present invention. In solid electrolytic capacitor 200, anode 13 is composed of sintered tantalum and has dielectric film 14 thereon. Solid electrolyte layer 15 and collector layer 16 are formed and laminated on dielectric film 14 in this order. Solid electrolyte layer 15 is composed of manganese dioxide or conductive polymer. Collector layer 16 can be silver paste layer 9 in FIG. 2B.

The inorganic particles also may be a core of the first silver particles. In other words, the inorganic particles on the order of nanometer as a core may be surrounded by deposited or layered silver to thereby form a silver layer, thereby constituting the first silver particles. The silver paste layer in this case also has the above configuration, namely silver paste layer includes the first silver particles having a peak particle size of 10 nm or more and 150 nm or less, the second silver particles having a peak particle size of 500 nm or more and 5 μm or less, and the resin material. The first silver particles and the second silver particles are included at a ratio of 70 wt % or more as main components in the silver paste layer.

This configuration can suppress an increased cost even when the first silver particles of an increased volume are included. Thus, the oxygen permeation path can have a longer path while reducing the contact resistance between silver paste layer 9 and the lower layer (carbon layer), thus achieving a low ESR characteristic. In particular, the inorganic particles surrounded by the silver layer can achieve a low ESR characteristic, even when the inorganic particles are included in an amount exceeding 20% volume ratio with respect to the total volume of the first silver particles and the second silver particles.

INDUSTRIAL APPLICABILITY

The silver paste layer according to the present invention is useful for a solid electrolytic capacitor having a low ESR characteristic.

The invention claimed is:
1. A solid electrolytic capacitor comprising:
a capacitor element having a base body composed of conductive material, a dielectric film formed on the base body, a solid electrolyte layer formed on the dielectric film, and a collector layer formed on the solid electrolyte layer and including at least a silver paste layer;
a first external terminal electrically connected to the base body; and
a second external terminal electrically connected to the collector layer,
wherein the silver paste layer includes:
first silver particles having a peak particle size of 150 nm or less;
second silver particles having a peak particle size of 500 nm or more;
inorganic particles composed of material different from silver; and
resin material,
wherein the inorganic particles are conductive and included at a volume ratio of 15% or more and 50% or less with respect to the total of the first silver particles and the second silver particles.
2. The solid electrolytic capacitor according to claim 1, wherein the inorganic particles are graphite, and the inorganic particles are included at a volume ratio of 15% or more and 40% or less with respect to the total of the first silver particles and the second silver particles.

3. The solid electrolytic capacitor according to claim 1,
wherein a particle size distribution of the inorganic particles has a peak value lower than that of a particle size distribution of the second silver particles.

4. A solid electrolytic capacitor comprising:
a capacitor element having a base body composed of conductive material, a dielectric film formed on the base body, a solid electrolyte layer formed on the dielectric film, and a collector layer formed on the solid electrolyte layer and including at least a silver paste layer;
a first external terminal electrically connected to the base body; and
a second external terminal electrically connected to the collector layer,
wherein the silver paste layer includes:
  first silver particles having a peak particle size of 150 nm or less;
  second silver particles having a peak particle size of 500 nm or more; and
  resin material,
wherein the first silver particles are particles obtained by surrounding inorganic particles as a core with a silver layer.

* * * * *